Feb. 25, 1958 V. R. ABRAMS 2,824,344
STERILIZING APPARATUS
Filed April 19, 1955 5 Sheets-Sheet 1

INVENTOR.
Victor R. Abrams
BY Olson & Trexler
Attys

INVENTOR.
Victor R. Abrams
By: Olson & Trexler
Attys.

Feb. 25, 1958  V. R. ABRAMS  2,824,344
STERILIZING APPARATUS
Filed April 19, 1955  5 Sheets-Sheet 3
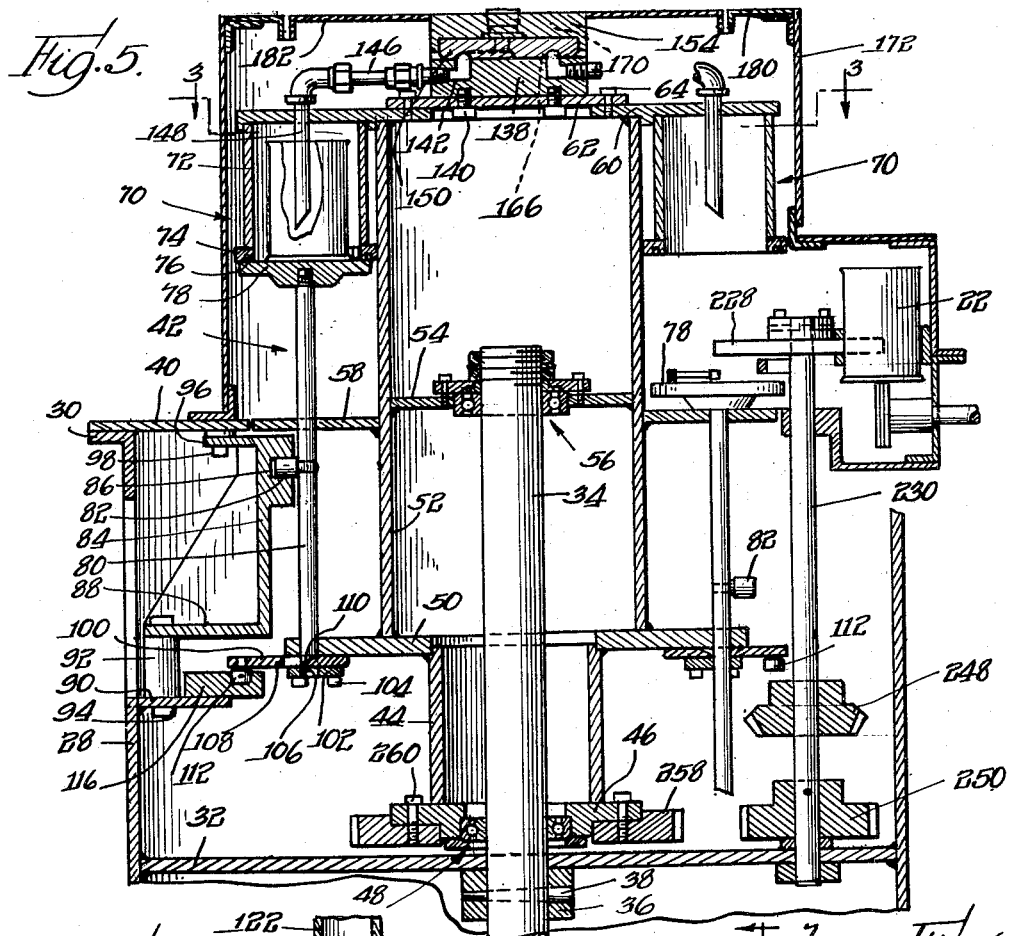
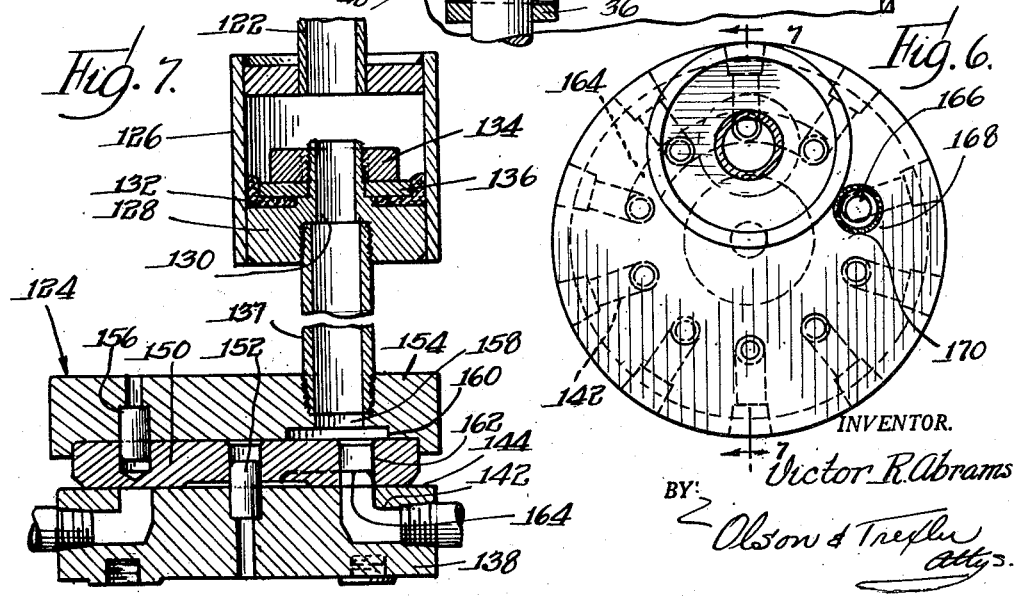
INVENTOR.
Victor R. Abrams
BY Olson & Trexler
  Attys.

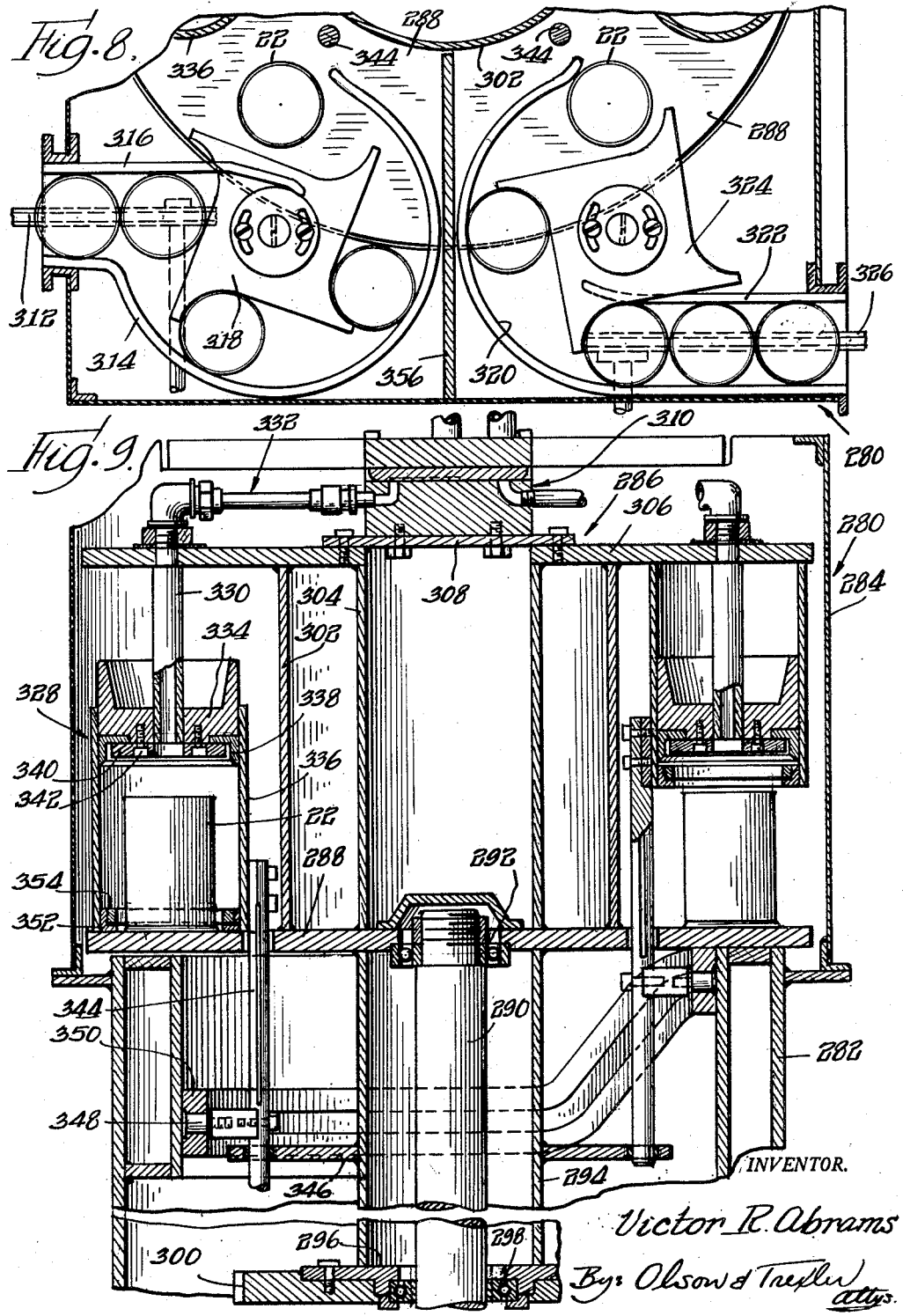

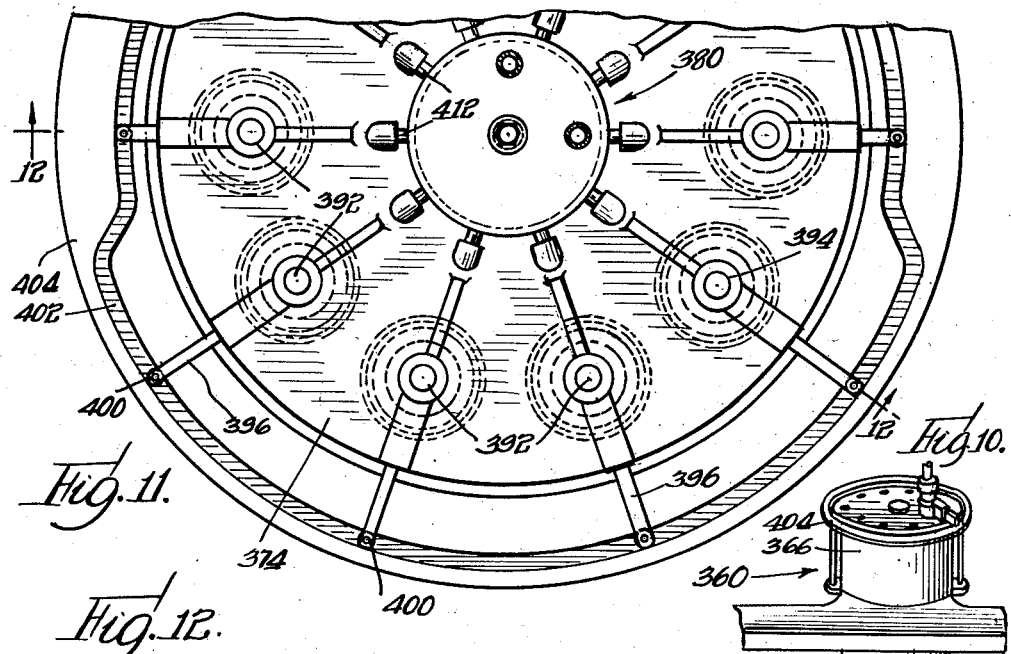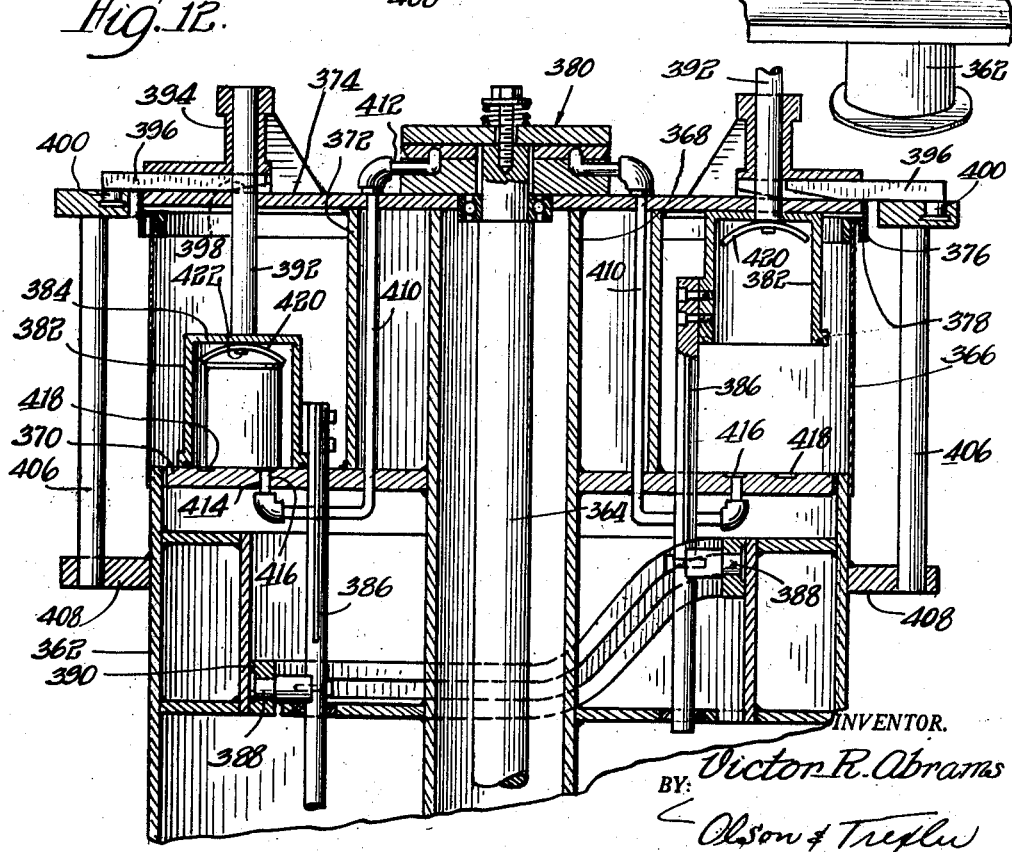

United States Patent Office 2,824,344
Patented Feb. 25, 1958

2,824,344

STERILIZING APPARATUS

Victor R. Abrams, Rockford, Ill., assignor to W. F. and John Barnes Company, Rockford, Ill., a corporation of Illinois Application April 19, 1955, Serial No. 502,481

16 Claims. (Cl. 21—80)

The present invention relates to a novel apparatus for processing or sterilizing articles, and more particularly to a novel apparatus for processing or sterilizing articles such as containers and the like.

It has been found that articles or containers such as cans, bottles, jars, and the like may be sterilized more rapidly and thoroughly by subjecting them to saturated or wet steam under a pressure substantially greater than atmospheric pressure and at a high temperature. The equipment heretofore in general use has either been incapable of utilizing steam under pressure or has otherwise not been fully satisfactory. For example, certain equipment heretofore in use requires that a batch of containers be placed in a large chamber whereupon the chamber is filled with the sterilizing fluid or steam so that the sterilizing process is relatively slow and uneconomical, and certain equipment is unduly bulky and requires a great amount of floor space.

It is an important object of the present invention to provide a novel apparatus for processing or sterilizing articles such as containers in a relatively rapid and economical manner.

More specifically, it is an object of the present invention to provide a novel apparatus which may utilize saturated steam at high pressures and temperatures for successively sterilizing a series of articles such as containers conveyed along a predetermined path of travel.

A further object of the present invention is to provide a novel apparatus of the above described type wherein the sterilized articles or containers are maintained in a sterile atmosphere so that they may be used in an aseptic canning process if desired.

Still another object of the present invention is to provide a novel apparatus of the above described type which is relatively compact so that it requires relatively little floor space.

Other and more detailed objects and advantages of the present invention will become apparent from the following description and the accompanying drawings, wherein:

Fig. 5 is a fragmentary sectional view taken along line 5—5 in Fig. 3;

Fig. 6 is a fragmentary cross sectional view taken along line 6—6 in Fig. 1;

Fig. 7 is a sectional view taken along line 7—7 in Fig. 6;

Fig. 8 is an enlarged fragmentary sectional view similar to Fig. 3, but showing a modified form of the present invention;

Fig. 9 is a fragmentary vertical sectional view of the embodiment of the apparatus shown in Fig. 8;

Fig. 10 is a perspective view of another modified form of the present invention;

Fig. 11 is a fragmentary plan view of the apparatus shown in Fig. 10; and

Fig. 12 is a fragmentary sectional view taken along line 12—12 in Fig. 11.

Figure 1:
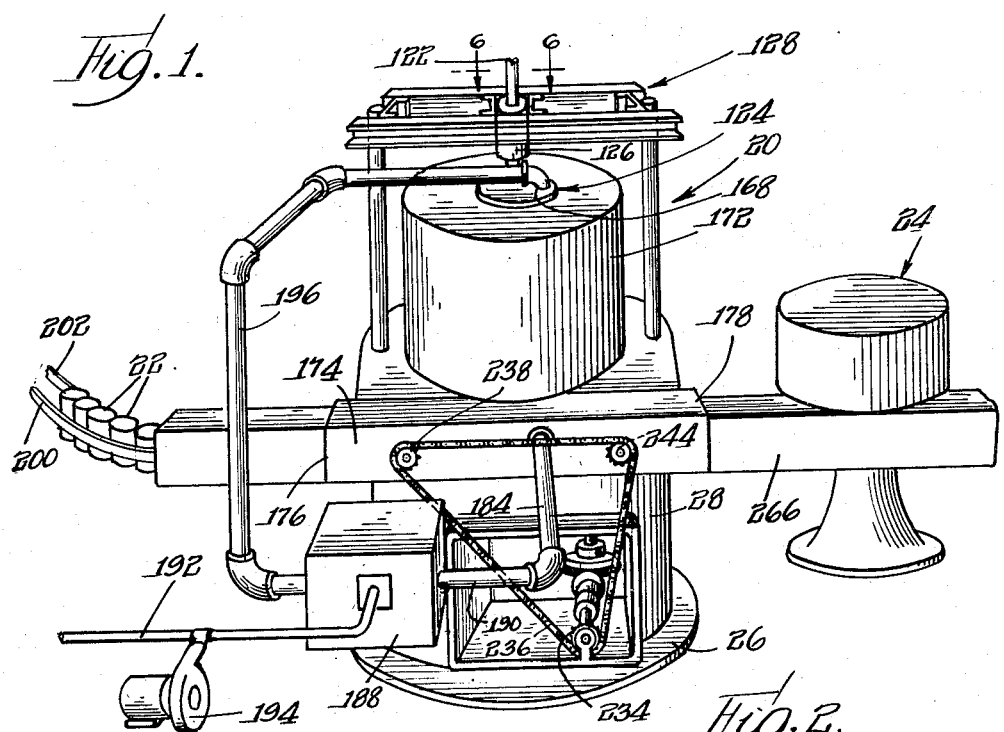
Fig. 1 is a perspective view of an apparatus embodying the principles of this invention.
Figure 2:
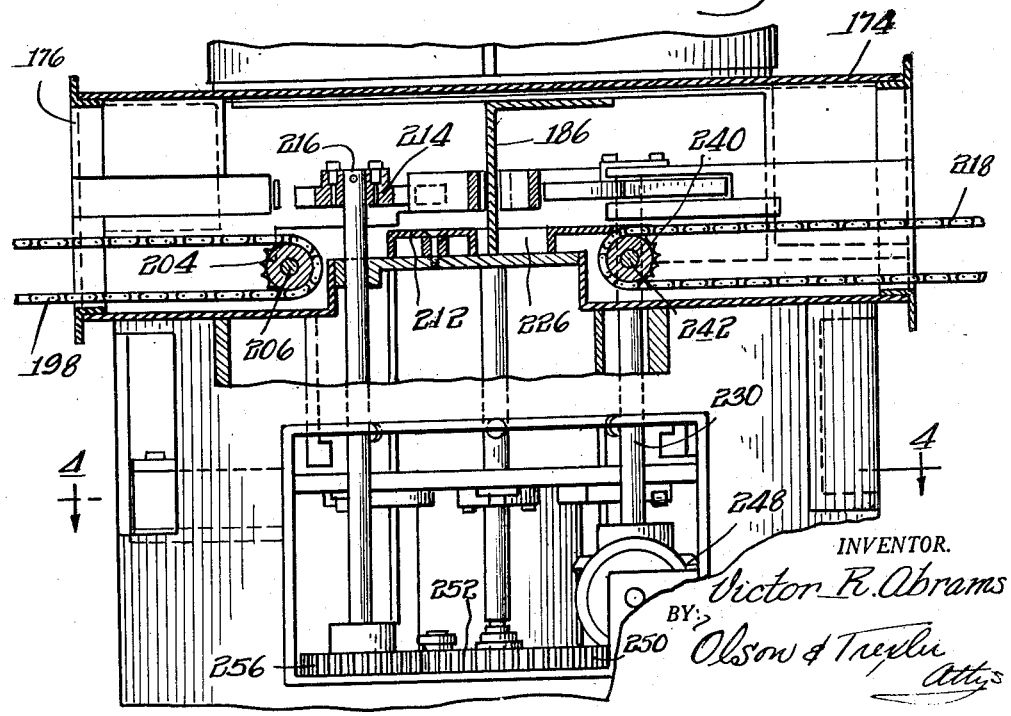
Fig. 2 is a fragmentary sectional view of the lower portion of the apparatus as seen along line 2—2 in Fig. 3.

While the apparatus of this invention may be used for processing or sterilizing various articles for various purposes, it is particularly useful for sterilizing cans or containers to be used in an aseptic canning process. Therefore, for the purpose of illustrating the present invention, an apparatus 20 is shown in Fig. 1, which is adapted to receive containers or cans 22 from a suitable source of supply, sterilize the containers rapidly and thoroughly with saturated stetam under pressure, and discharge the containers under aseptic conditions to a filling device 24 of known construction.

The apparatus 20 is provided with a base structure including a base plate 26 and a cylindrical housing member 28 welded or otherwise secured to the base plate and having an upper peripheral flange 30. A circular plate member 32 is disposed within and welded to the housing member 28, which plate member has a central aperture through which an upright center post 34 extends. An apertured block 36 is welded to the plate member 32 for receiving the center post, and a pin 38 extends through the block and the center post for securing the center post in position. An annular plate 40 is secured to the flange 30 and partially closes the upper end of the cylindrical housing member 28.

Figure 3:
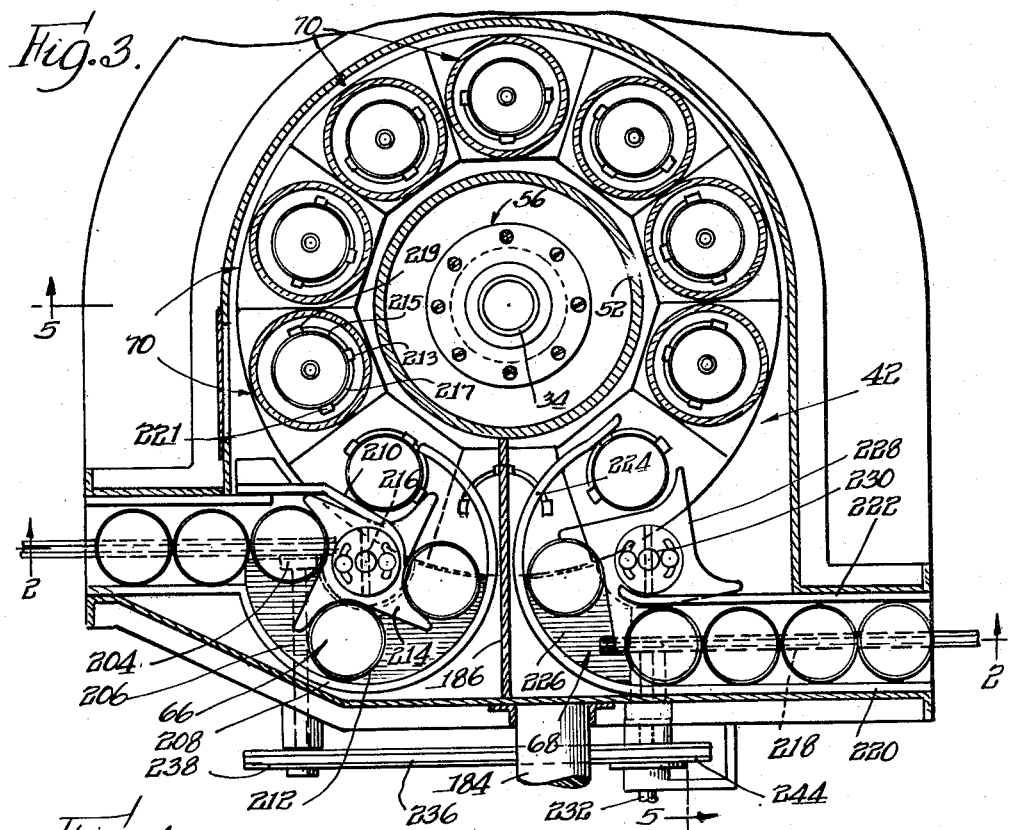
Fig. 3 is a sectional view taken along line 3—3 in Fig. 5.

As shown best in Figs. 3 and 5, conveyor or turret means 42 is rotatably mounted on the center post 34. This means includes a cylinder 44 having its lower end welded to an annular member 46, which annular member is rotatably mounted on the post 34 by suitable bearing means 48. The upper end of the cylinder 44 is welded to an annular plate 50, and another cylinder 52 is disposed on and is welded to the plate 50. An annular plate 54 is disposed within and is welded to the upstanding cylinder 52, which annular plate carries suitable bearing means 56 for rotatably connecting the conveyor or turret with the upper end of the post 34. Another annular plate member 58 is welded to the exterior of the cylinder 52, and it should be noted that this plate member is in the same horizontal plane as the housing plate member 40 and has an outer diameter substantially equal to the inner diameter of the plate member 40 for a purpose to be described below. Still another annular plate member 60 is welded to the upper end of the cylinder 52 and the central opening in this plate member is closed by a disk 62, which is secured in position by a plurality of screws 64.

Figure 4:
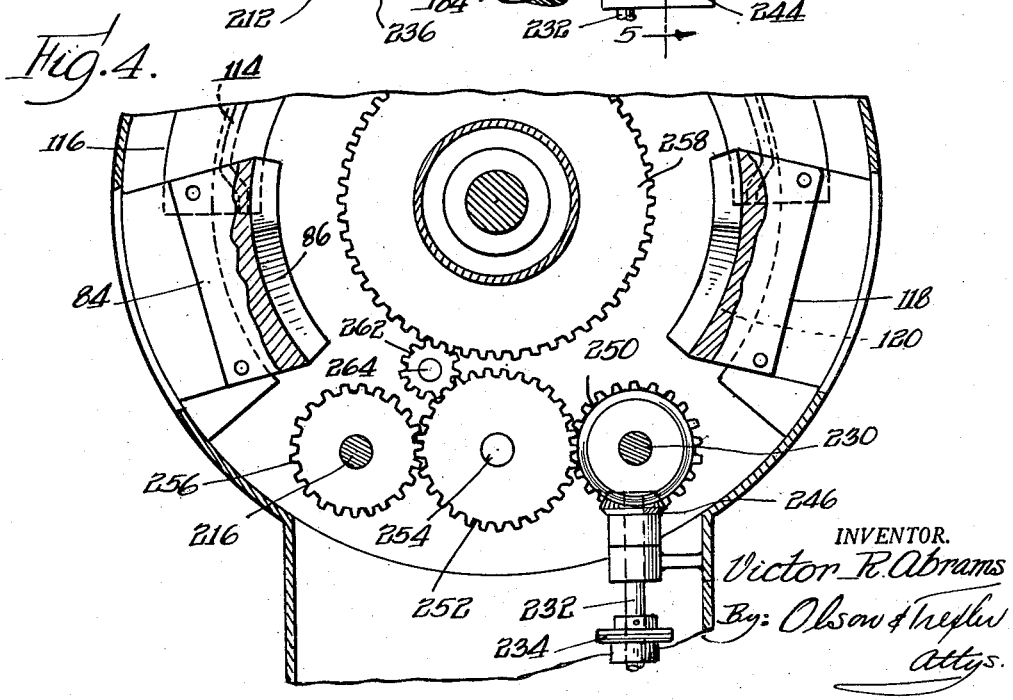
Fig. 4 is a fragmentary cross sectional view taken along line 4—4 in Fig. 2.

The conveyor or turret means is rotated by a drive mechanism to be described below, so as to pick up articles or cans 22 at a loading station 66, and discharge processed or sterilized containers at a discharging station 68. In order to sterilize the containers between the stations, the turret or conveyor means is provided with a plurality of circumferentially spaced means 70 for providing a plurality of substantially sealed chambers into which the containers are loaded and into which a processing fluid is injected. As shown in Figs. 3 and 5, each of these chamber means includes a cylinder 72, which has its upper end welded to the annular plate member 60. An annular flange member 74 carrying a sealing ring 76 is welded to the lower end of each of the cylinders 72. Thus, each of the cylinders 72 in combination with the plate member 60 provides a bell jar adapted to receive a can or container to be sterilized. Beneath each of the cylinders 72, there is disposed a platform member 78 adapted to receive and support a can or container, which platform members are mounted so that they may be shifted from a lowered can receiving and discharging position to a raised bell jar or chamber closing position as shown in Fig. 5. More specifically, each of the platforms 78 is fixed to the upper end of a rod 80, which is slidably disposed in aligned apertures in the annular plate members 50 and 58. Each of the guide rods 80 carries a cam roller 82. As shown in Figs. 4 and 5, a cam member 84 is disposed within the housing cylinder 28 adjacent the loading station, which cam member has a spiral slot 86 inclined upwardly in the direction of movement of the conveyor. As will be understood, after a can or container has been placed on a platform 78 at the loading station, rotation of the conveyor causes the cam roller 82 to enter the lower end of the slot 86, whereupon the cam co-operates with the roller to raise the platform into sealing engagement with the lower end of its associated cylinder 72, as shown at the left hand side of Fig. 5. The cam member 84 has a lower flange portion 88 located above a bracket plate 90 by a spacing block 92 and secured to the bracket by bolt means 94, and an upper flange portion 96 secured to the annular plate member 40 by one or more screws 98.

As will be set forth more fully hereinbelow, processing fluid or steam under pressure is introduced into the sealed chambers for sterilizing the cans. The steam pressure may be varied in accordance with the particular process to be performed, and merely by way of example it may be stated that the use of steam pressures of 100 p. s. i. to 150 p. s. i. or more are contemplated. With such steam pressures within the closed chambers, it is apparent that there will be a considerable force tending to push the platforms 78 downwardly. In order to prevent undue injury or damage to the cam rollers 82 and the cam 84 as a result of the downward thrust applied to the platform 78 and the rods 80 by the steam under pressure, the cam 84 extends for only a short segment of the circular movement of the conveyor means, and other means is provided for holding or locking the platforms in the raised positions as they move past the loading station and the cam 84 toward the discharge station. This holding or locking means includes a lock bolt 100, associated with each of the rods 80 and adapted to engage the lower end of its associated rod to prevent downward movement thereof. Each of the lock bolts is mounted beneath the annular plate member 50 for radial sliding movement by a slide block 102, which is secured to the plate 50 by a plurality of screws 104. Each slide block is provided with an aperture 106 through which its associated push or guide rod 80 may extend, and each lock bolt is also provided with an aperture 108 through which its associated push rod may extend. Thus, when a lock bolt is shifted so that its aperture 108 is in alignment with the associated aperture 106, the push rod controlled thereby is free for up and down movement. However, when the push rod 80 has then moved to its raised position by the cam 84, its associated lock bolt may be shifted to engage its lower end and prevent downward movement. As shown in Fig. 5, each of the push rods 80 and its associated lock bolt are preferably provided with mating cam or wedge surfaces 110, so that the lock bolt serves to wedge the associated platform 78 tightly against the bottom edge of its chamber or bell jar. In order to shift the lock bolts to and from locking positions, each of the lock bolts carries a cam roller 112, which is adapted to enter a cam slot 114 in a substantially semi-circular horizontally disposed cam member 116. As shown in Fig. 4, the cam member 116 is located so that the rollers 112 enter the slot 114 before the rollers 82 leave the cam slot 86.

As shown in Fig. 4, the holding or locking cam member 116 terminates in advance of the discharge station, and a cam member 118 is provided for lowering the cam supporting platform means in a controlled manner as they approach the discharge station. The cam 118 is substantially identical to the cam member 84 and therefore need not be described in detail. Of course, it is understood that the cam slot 120 of the cam member 118, which is adapted to co-operate with the cam rollers 82, spirals downwardly as it approaches the discharge station.

The processing fluid or steam under pressure is successively directed to the sealed chambers from a source of supply, not shown, through an inlet conduit 122 and valve means 124. The inlet conduit 122 connects with the interior of a cylinder 126, which is fixed to the frame means 128 supported above the conveyor or turret. A piston 128 is slidably disposed within the cylinder 126 and is provided with an aperture 130 extending therethrough. A suitable packing member 132 is assembled with the piston and retained in assembled relationship by means of a nut member 134 and a washer 136. A pipe or conduit 137 is threaded into the piston and communicates with the aperture 130 for directing the steam to the valve means 124. The piston structure just described serves to restrain escape or leakage of steam from the valve means in the manner set forth below.

The valve means 124 includes a block 138 which is mounted on the plate member 62 and secured in position by a plurality of screws 140. The block 138 is provided with a plurality of circumferentially spaced ports 142 each of which extends between the face 144 of the block and the peripheral edge thereof. Each of the ports 142 is connected with the interior of one of the bell jars or chamber means through conduit means 146 and a nozzle 148 which extends through the plate 60 and well within its associated cylinder 72. A valve disk 150 formed from a suitable material is disposed on the block 138 and located concentrically with respect thereto by means of a centering pin 152. A pressure plate 154 is disposed on the valve disk and the disk is locked against rotation with respect to the plate 154 by one or more pins 156. The plate 154 is provided with an inlet aperture 158 into which the conduit or pipe 137 is threaded. The aperture 158 communicates with an enlarged recess 160 formed in the plate 154, which recess in turn communicates with an inlet aperture 162 formed in the valve disk. The valve disk is also formed with an elongated arcuate slot 164, which communicates with the inlet aperture 162 and which is also adapted to communicate with a plurality of the ports 142 and the block 138. Thus, as the block 138 rotates with the turret relative to the fixed valve disk 150 and the fixed plate 154, the ports 142 successively advance into registration with the inlet slot 164, so that steam is injected through the nozzles 148 into the containers within the associated bell jars or chamber means. It will be appreciated, that the steam under pressure within the recess 160 and the slot 164 tends to raise the valve disk 150 from the block 138 and also to raise the plate 154 from the valve disk. However, this tendency is overcome and leakage is prevented by the above described piston structure which exerts a downward force through the pipe 137 so that the plate 154 and the disk 150 are securely held in position.

As shown best in Fig. 6, the steam inlet slot 164 is long enough so that it simultaneously communicates with a plurality of the ports 142. Thus, the steam under pressure is maintained within the bell jars or chamber means for a considerable portion of their travel from the loading station to the discharge station. After the ports 142 pass the slot 164, the steam is exhausted from their associated bell jars or chamber means, and this is accomplished by providing the disk 150 with an outlet aperture 166 which is adapted to register with the ports 142 and which also communicates with an outlet conduit 168 through an aperture 170 in the plate 154.

In order to maintain processed or sterilized cans or containers under aseptic conditions within the apparatus, means is provided for surrounding the turret or conveyor means with an atmosphere of sterile gas. This means includes a cylindrical housing member 172 mounted on the annular plate member 40 and enclosing the upper portion of the turret or conveyor means. In addition, the loading and discharge stations are enclosed by a sheet metal tunnel means 174, having an inlet end 176 and an outlet end 178. As shown best in Fig. 5, the upper end of the housing cylinder 172 is partially closed by an annular flange portion 180, and the remainder of the upper end is closed by a sheet metal disk 182 fixed to the plate member 154 of the valve means. The peripheral margin of the disk 182 is disposed adjacent the inner margin of the flange portion 180, so as to allow for relative thermal expansion between these elements of the housing while at the same time substantially closing and sealing the housing. It should be noted, that the annular plate 58 of the turret cooperates with the annular plate 40 of the housing to provide a seal for preventing the escape of substantial amounts of sterile gas from the upper housing portion into the lower housing portion. With this structure it is seen, that the container support platforms and the bell jars of the turret along with the loading and discharge stations are enclosed by housing means which is substantially sealed except for inlet and outlet openings provided for the containers.

A sterile gas is introduced into the upper housing adjacent the discharge station through a conduit 184. A baffle plate 186 is fixed within the housing as shown in Fig. 3, so that the sterile gas is directed over the discharge station by the baffle and around the turret or conveyor by the turret cylinder 52 and finally over the loading station and out through the inlet opening of the tunnel means. Since the sterile gas moves in a direction opposite to the direction of movement of the conveyor or turret, assurance is provided that no contaminated air or gas will be present within the housing adjacent the discharge station. Any suitable means may be provided for supplying sterile gas to the inlet conduit 184 and in the apparatus shown in Fig. 1, this means includes a contact super-heater 188 of known construction, which has an outlet conduit 190 connected with the conduit 184. Fuel gas is supplied to the super-heater through a conduit 192, and air is supplied to the conduit 192 by a motor driven blower 194. In addition, the steam exhausted from the bell jars is directed to the super-heater through conduit means 196, which is connected with the outlet conduit 168.

The containers 22 to be processed or sterilized are supplied to the loading station by an endless feed chain 198 on which the containers are supported between a pair of guide rails 200 and 202. The chain 198 is wrapped around a sprocket wheel 204 and a second rotatably supported sprocket wheel, not shown. The sprocket wheel 204 is fixed on a rotatably mounted shaft 206, which is driven in timed relationship with the turret by the means described below. At the loading station, means is provided for transferring successive containers from the endless chain to successive platforms on the turret. This means includes a pair of guide bars 208 and 210, which form continuations of the guide bars 200 and 202 and an arcuate member 212 between the guide bars over which the containers may be advanced from the chain to the turret. A star wheel 214, fixed on a rotatably mounted shaft 216, is provided for moving the containers over the arcuate slide surface 212 and onto the platforms of the turret or conveyor means. The containers are positioned and held on the platforms by means including a block 213 fixed in each platform and having spring arms 215 and 217 extending therefrom and carrying blocks 219 and 221.

At the discharge station, there is provided an endless chain 218, disposed between a pair of guide bars 220 and 222 for removing the processed containers from the housing. Means similar to the above described transfer means is provided for directing the processed containers from the platforms of the turret or conveyor means to the chain. The transfer means includes an arcuate guide bar portion 224 for stripping the containers from the turret means, a member 226 providing an arcuate slide surface, and a star wheel 228 fixed on a rotatably mounted shaft 230.

The means for driving the turret or conveyor, the star wheels and the feed chains in timed relationship includes a main drive shaft 232 which is adapted to be connected with a motor or any other suitable source of power. A sprocket 234 is fixed on the shaft 232 and a chain 236 is wrapped around this sprocket, and a sprocket 238 fixed on the shaft 206. The conveyor chain 218 is wrapped around a sprocket 240 mounted on a rotatable shaft 242, and this shaft is also driven by the chain 236 which extends around a sprocket 244.

Also fixed on the drive shaft 232 is a beveled gear 246, which meshes with a beveled gear 248 on the star wheel shaft 230. Thus, the star wheel shaft 230 is driven directly by the shaft 232. In order to drive the other star wheel shaft 216, another gear 250 is mounted on the shaft 230 and meshes with an idler gear 252 mounted on a rotatably supported stub shaft 254, the idler gear also meshes with a gear 256, mounted on the shaft 216. In order to drive the turret or conveyor means, a large gear 258 is secured to the flange 46 by a plurality of screws 260, and this gear meshes with a pinion 262 mounted on a stub shaft 264. The pinion also meshes with and is driven by the gear 252.

A brief summary of the operation of the above described apparatus is as follows. The upper housing portion is first flushed with sterile gas to eliminate any contaminated air therein, whereupon the motor or other power source is energized to drive the shaft 232, which in turn drives the container feed and discharge chains, the star wheels and the turret or conveyor in the manner described above. Then the containers 22 are fed into the housing by the chain 198 and are deposited on successive platforms 78 at the loading station. As each platform, with a container thereon, leaves the loading station, it is raised into sealing engagement with the lower end of its associated bell jar to provide a sealed chamber enclosing the container. After the chamber has been closed and sealed, steam under pressure is directed through the above described valve means and nozzle into the container. The steam under pressure is maintained within the container, while the turret travels through an arc equal to the length of the arc of the slot 164 in the valve means. As mentioned above, the steam is preferably saturated steam under a pressure substantially greater than atmospheric pressure and at a raised temperature, so that the container will be quickly and thoroughly sterilized. Upon continued rotation of the turret or conveyor means, the bell jars or chambers are exhausted and the platforms are lowered to the discharge station. The processed or sterilized containers are then transferred to the chain 218, which directs them through a tunnel 266 filled with a sterile gas to the container filling mechanism 24 or to any other desired apparatus. Preferably, the driving shaft 232 and the elements driven thereby are operated continuously, but it is understood that in certain instances the drive shaft may be operated intermittently, if desired, such for example as when a substantially increased period of time is required for sterilizing the containers.

In Figs. 8 and 9, there is shown an apparatus 280 which embodies a modified form of the present invention. This apparatus is similar to the above described structure, and differs primarily in the construction of the bell jar means which utilizes the pressure of the sterilizing steam for holding the bell jar means closed whereby the above described locking mechanism may be eliminated.

In general, the apparatus 280 includes a base or lower housing cylinder 282, upper housing means 284, and a rotatable turret or conveyor 286 disposed within the housing. The conveyor includes an annular plate member 288 which is rotatably mounted on a fixed center post 290 by a bearing assembly 292. A cylinder 294 surrounds the post and is welded to the plate 288. The lower end of the cylinder 294 is rotatably connected with the center post by means of an end flange 296 and a bearing assembly 298. A gear 300 is connected with the end flange 296, which gear is adapted to be driven by a suitable drive of the type described above. A pair of concentric upstanding cylinders 302 and 304 is welded to the upper side of the plate 288 and an annular plate 306 is welded to the upper ends of the cylinders. The upper end of the cylinder 304 is closed by a disk 308 which supports valve means 310 that may be substantially identical to the valve means described above. The apparatus 280 also includes an endless chain 312 for feeding containers between guide bars 314 and 316 at the loading station, and a star wheel 318 for transferring the containers from the chain onto the plate member 288 which serves to support the containers on the turret or conveyor means. In addition, the apparatus 280 is provided with guide bars 320 and 322, and a star wheel 324 at the discharge station for transferring the processed containers onto a discharge chain 326.

In place of the above described shiftable platform and bell jar structure, the apparatus 280 is provided with a plurality of means 328 for forming bell jars or sealed chambers around each of the containers passing through the apparatus. Each of the means 328 includes a steam pipe or conduit 330 which is fixed to and depends from the plate 306. The upper end of the pipe 330 is adapted to be connected with a source of steam under pressure through conduit means 332 which communicates with one of the ports in the valve means 310. A piston 334 is fixed to the lower end of the pipe 330, and a sleeve or cylinder 336 is slidably disposed over the piston. A sleeve packing 338 formed of suitable material is fixed to the piston by a clamping ring 340 and a plurality of screws 342. As shown in Fig. 5, the sleeve 336 is adapted to be shifted to and from raised and lowered positions and this is accomplished by securing the sleeve to the upper end of a push rod 344, which push rod is slidably supported for up and down movement by the plate 288 and an annular plate 346 welded to the cylinder 294. In order to actuate the push rod, a cam roller 348 is mounted thereon for co-operation with a cam 350. As will be understood, the cam 350 preferably completely encircles the center post and the cam groove is formed so that each sleeve will be raised when it is adjacent the loading and discharge stations and will be lowered while it is moving from the loading station toward the discharge station.

In order to maintain the chamber means 328 tightly sealed when the steam under pressure is injected therein, a piston-like sealing ring 352 is disposed within the lower end of the sleeve 336 and held in position by a retaining ring 354. With this arrangement, it is seen that the fluid or steam under pressure acts against the upper radially extending surfaces of the sealing ring 352 to press the ring firmly into engagement with the platform plate 288.

It is understood, that the apparatus 280 is to be provided with means similar to the above described means for introducing a sterile gas into the housing adjacent the discharge station, and for directing the gas around the housing in a direction opposite to the direction of movement of the conveyor. This means includes a baffle plate 356 disposed between the loading and discharge stations, which baffle plate co-operates with the upstanding cylinder 302 of the conveyor or turret in directing the sterile gas in the desired manner.

In Figs. 10, 11, and 12, there is shown another modified form of the present invention. This embodiment is similar to the above described apparatus and therefore only the principal modifications will be set forth. The apparatus 360, shown in these figures, includes a base housing cylinder 362, a center post 364, and an upper housing cylinder 366. A turret or conveyor is rotatably mounted on the center post and includes an elongated cylinder 368, a container supporting plate or platform 370 welded to the cylinder 368, and a concentrically disposed upstanding cylinder 372 welded to the plate 370. Another plate member 374 is welded to the upper ends of the cylinders 368 and 372 and carries flange means 376 around its periphery, which flange means co-operates with flange means 378 on the housing cylinder 366 to provide a gas seal. Valve means 380, which is similar to the above described valve means is provided for controlling the flow of steam under pressure to and from the bell jars or sealed chambers.

The apparatus 360 is similar to the above described apparatus 280 in that the containers to be processed are supported on and carried by the plate member 370. However, in this embodiment, each of the bell jar or chamber means includes a sleeve or cylinder 382 which is fixed to or made integral with an end member 384 and the entire bell jar means is raised and lowered. Each of the bell jar means is connected to the upper end of a reciprocably mounted push rod 386, and each push rod carries a cam roller 388 which rides in the slot of a circular cam member 390. Each of the bell jars is also connected with an upstanding guide rod 392 which extends upwardly through an aperture in the plate 374 and is slidably confined by an upstanding bearing block 394.

In order to hold or lock the bell jars against the container supporting plate 370, a locking bolt 396 is slidably disposed in a suitable slot in each of the bearing blocks 394 which bolt is adapted to be inserted into an opening 398 in its asosciated guide rod 392. Preferably, the locking bolt and its associated push rod are provided with mating cam surfaces so that when the bolt is inserted in the aperture 398 the bell jar is wedged against the plate 370. Each of the locking bolts 396 carries a cam roller 400, which extends into a slot 402 in a cam member 404. The horizontally disposed cam member 404 is supported on a plurality of rods 406, which in turn are supported by bracket members 408 welded or otherwise fixed to the housing cylinder 362. It is understood, of course, that the cam slot 402 is formed so that the locking bolts 396 will be inserted into the apertures 398 when the bell jars are lowered against the plate 370, and the locking bolts will be withdrawn from the apertures when the bell jars are adjacent the loading and discharge stations, so as to permit the bell jars to be shifted to their raised position.

In order to introduce steam under pressure into the containers enclosed within the bell jars, a plurality of conduit means 410 is provided, each of which has one end 412 connected with one port of the valve means and an opposite end 414 connected with an aperture 416 in the plate 370. As will be understood, each of the apertures 416 is disposed in alignment with one of the bell jars. In addition, the containers are preferably fed to the apparatus so that they are deposited with their open ends down on the plate 370 whereby the steam is directed through the openings 416 into the interiors of the containers. The plate or platform 370 is provided with a recess 418 adjacent each of the openings 416 for permitting steam to escape beneath the edge of a can or container being processed into the remainder of the bell jar. In order to prevent the containers from being raised and tipped by the steam under pressure injected therein, a curved spring 420 is secured to the end 384 of each of the bell jars by a screw member 422 for engaging the upper end of the container within the bell jar.

From the above description, it is seen that this invention has provided a novel apparatus, which is adapted to process or sterilize a series of containers thoroughly and economically. More specifically, it is seen that the present invention has provided a novel apparatus by which a moving series of containers may be subjected to saturated steam at high temperatures and pressures whereby sterilization of the containers is effected rapidly and thoroughly. It will be appreciated that the present invention has also provided a novel apparatus for sterilizing containers, which apparatus is of compact construction.

While the preferred embodiments of the present invention have been shown and described herein, it is obvious that many structural details may be changed without departing from the spirit and scope of the appended claims.

The invention is claimed as follows:

1. An apparatus for processing articles such as containers and the like comprising movably mounted conveyor means including means for supporting articles to be processed, means adjacent and movable with said conveyor means and co-operable with said supporting means for combining therewith for providing a substantially sealed pressure chamber around an article on said supporting means, means for directing processing fluid into said chamber, and means for relatively shifting said supporting means and said means co-operable therewith into and out of co-operation to permit articles to be loaded onto and discharged from said supporting means.

2. An apparatus for processing articles such as containers and the like, comprising movably mounted endless conveyor means including means for supporting a series of articles to be processed, means adjacent and movable with said conveyor means and co-operable with said supporting means for combining therewith for providing substantially sealed pressure chamber means enclosing certain of the articles on said supporting means, means for directing processing fluid into the chamber means, and means for relatively shifting said supporting means and said means co-operable therewith for opening and closing said chamber means to permit loading and unloading of the articles.

3. An apparatus for processing articles such as containers and the like comprising movably mounted endless conveyor means including means for supporting a series of articles to be processed, means adjacent and movable with said conveyor means and co-operable with said supporting means for providing substantially sealed pressure chamber means enclosing certain of the articles on said supporting means, means for directing processing fluid under pressure into said chamber means, means for relatively shifting said supporting means and said means co-operable therewith for opening and closing said chamber means to permit loading and unloading of the articles, and means for holding said supporting means and said co-operable means together to prevent said fluid under pressure from escaping from the chamber means.

4. An apparatus, as defined in claim 3, wherein said last named means includes means for positively and releasably locking said supporting means and said co-operable means together.

5. An apparatus, as defined in claim 3, wherein said last named means includes piston means connected with said cooperable means and operable by the fluid under pressure within said chamber means to force said cooperable means against said supporting means.

6. An apparatus for processing articles such as containers and the like comprising movably mounted endless conveyor means including means for supporting a series of articles to be processed, a plurality of means movable with said conveyor means and cooperable with portions said support means for providing a plurality of substantially sealed pressure chamber means, each for enclosing certain of the articles on said support means, means for successively relatively shifting said portions of said support means and said means cooperable with said portions for successively maintaining said chamber means open adjacent a loading station, then closing said chamber means while said support means portions move toward a discharge station, and then opening said chamber means adjacent said discharge station, and means for directing processing fluid under pressure into said chamber means moving between the loading and discharge stations.

7. An apparatus, as defined in claim 6, wherein said support means portions are shiftably supported and wherein said shifting means is operable successively to shift said support means portions into co-operating engagement with the means co-operable therewith for providing chamber means.

8. An apparatus, as defined in claim 6, wherein said co-operable means are shiftably mounted, and wherein said shifting means is operable successively to shift said co-operable means into engagement with said support means portions for providing said chamber means.

9. An apparatus, as defined in claim 8, wherein each of said co-operable means includes a piston-like end member fixed on said conveyor means in alignment with one of said supporting means portions, and a cylinder slidably disposed on said end member and shiftable into and out of engagement with said one supporting means portion.

10. An apparatus, as defined in claim 9, which includes annular piston means fixed to an interior support means engaging an end portion of said cylinder and operable by processing fluid under pressure to hold said cylinder against said one supporting means portion.

11. An apparatus for processing articles such as containers and the like comprising housing means adapted to contain a sterile gas, endless conveyor means mounted within said housing means for movement in a predetermined direction, said conveyor means including means for supporting a series of articles to be processed, means adjacent and movable with said conveyor means and co-operable with said supporting means for providing substantially sealed chamber means movable within said housing means with said conveyor means for successively enclosing certain of the articles on said supporting means, means for directing processing fluid under pressure into the substantially sealed chamber means, means for opening and closing said chamber means to permit loading and unloading of the articles, and means for directing sterile gas through said housing means in a direction opposite to the direction of movement of said conveyor means.

12. An apparatus for processing articles such as containers and the like comprising means for providing a substantially sealed pressure chamber completely around an article to be processed, means supporting said chamber means for movement to and from article loading and discharge stations, means for opening said chamber means at said stations, and for closing said chamber means while the chamber means is moving from the loading station toward the discharge station, and means connected with said chamber means for directing processing fluid into the chamber means while said chamber means is closed and is moving from the loading station to the discharge station.

13. An apparatus for processing articles such as containers and the like comprising means for providing a series of substantially sealed pressure chambers, each for completely surrounding an article to be processed, means supporting said chamber means for successive movement to and from article loading and discharge stations, means for opening said chamber means at said stations and for closing said chamber means while they are moving from the loading station toward the discharge station, and means connected with said chamber means for successively directing processing fluid under pressure into said chamber means while they are closed and are moving from said loading station to said discharge station.

14. An apparatus for processing articles such as containers and the like comprising a plurality of means for providing an endless series of substantially sealed pressure chambers each for surrounding an article to be processed, means supporting said chamber means for successive movement to and from article loading and discharge stations, means for opening said chamber means adjacent said stations and for closing said chamber means while the chamber means are moving from the loading station toward the discharge station, means connected with said chamber means for successively directing processing fluid under pressure into the chamber means while they are closed and are moving from said loading station to said discharge station, and means for holding said chamber means closed while processing fluid under pressure is being directed therein.

15. An apparatus for processing articles such as containers and the like comprising housing means adapted to contain a sterile gas, a plurality of means within said housing means for providing a plurality of sealed pressure chambers each for surrounding an article to be processed, means supporting said chamber means for successive movement to and from article loading and discharge stations within said housing means, means for opening said chamber means at said stations and for closing the chamber means while they are moving from the loading station toward the discharge station, means connected with said chamber means for successively directing processing fluid under pressure into the chamber means while they are closed and are moving from said loading station to said discharge station, and means for directing a sterile gas through said housing means opposite to the movement of said chamber means.

16. An apparatus for processing articles such as containers and the like comprising housing means adapted to contain a sterile gas, turret means rotatably mounted in said housing means, a plurality of means spaced around said turret means for providing a plurality of substantially sealed pressure chambers each for surrounding an article to be processed, means for successively opening each of said chamber means adjacent article loading and discharge stations within said housing means and for successively closing each of said chamber means while the chamber means are moving from the loading station toward the discharge station, means connected with said chamber means for directing processing fluid under pressure into the chamber means while they are closed and are moving from said loading station to said discharge station, and means for introducing a sterile gas into said housing means adjacent said discharge station and for directing the sterile gas through said housing means toward said loading station.

References Cited in the file of this patent

UNITED STATES PATENTS

| Number | Name | Date |
|---|---|---|
| 1,059,544 | Kiefer | Apr. 22, 1913 |
| 1,270,797 | Dunkley | July 2, 1918 |
| 1,309,785 | Taylor | July 15, 1919 |
| 1,591,533 | Kendall | July 6, 1926 |
| 1,608,634 | Taylor | Nov. 30, 1926 |
| 1,813,021 | Brown | July 7, 1931 |
| 1,914,145 | McClatchie | June 13, 1933 |
| 2,194,463 | Powell | Mar. 26, 1940 |
| 2,337,061 | Murch | Dec. 21, 1943 |
| 2,461,657 | Paasche | Feb. 15, 1949 |
| 2,544,007 | Cook | Mar. 6, 1951 |
| 2,549,216 | Martin | Apr. 17, 1951 |

FOREIGN PATENTS

| 671,135 | Germany | Feb. 2, 1939 |